US011151226B2

(12) United States Patent
Farrell et al.

(10) Patent No.: US 11,151,226 B2
(45) Date of Patent: *Oct. 19, 2021

(54) MANAGING APPLICATION SPECIFIC FEATURE RIGHTS

(71) Applicant: Microsoft Technology Licensing, LLC, Redmond, WA (US)

(72) Inventors: Terry Farrell, Dublin (IE); Daniel Jacobs, Kilmacanogue (IE)

(73) Assignee: Microsoft Technology Licensing, LLC, Redmond, WA (US)

(*) Notice: Subject to any disclaimer, the term of this patent is extended or adjusted under 35 U.S.C. 154(b) by 236 days.

This patent is subject to a terminal disclaimer.

(21) Appl. No.: 16/268,013

(22) Filed: Feb. 5, 2019

(65) Prior Publication Data

US 2019/0180005 A1 Jun. 13, 2019

Related U.S. Application Data

(63) Continuation of application No. 14/887,016, filed on Oct. 19, 2015, now Pat. No. 10,242,164.

(51) Int. Cl.
*G06F 21/00* (2013.01)
*G06F 21/10* (2013.01)
(Continued)

(52) U.S. Cl.
CPC .......... *G06F 21/105* (2013.01); *G06F 16/122* (2019.01); *G06F 21/121* (2013.01);
(Continued)

(58) Field of Classification Search
CPC .... G06F 21/105; G06F 21/121; G06F 21/629; G06F 16/122; G06F 2221/0768; H04L 67/06
See application file for complete search history.

(56) References Cited

U.S. PATENT DOCUMENTS 9,838,250 B1* 12/2017 Ali ........................... G06F 8/65
2003/0159035 A1* 8/2003 Orthlieb ................ G06F 21/121
713/168
(Continued)

FOREIGN PATENT DOCUMENTS

CN 103154948 A 6/2013
CN 104021009 A 9/2014

OTHER PUBLICATIONS

"Office Action Issued in European Patent Application No. 16787605.1", dated Nov. 23, 2020, 6 Pages.
(Continued)

*Primary Examiner* — Alexander Lagor
(74) *Attorney, Agent, or Firm* — International IP Law Group, PLLC (57) ABSTRACT

A system for modifying application specific feature rights (ASFR) is disclosed herein. The example system can include a file system to store a file, where the file system includes a number of ASFR corresponding to the file, where the number of ASFR designates a client type that is to trigger activation of features indicated by the number of ASFR. The system can include a processor and a computer-readable memory storage device storing executable instructions to be executed by the processor to cause a modifying service implemented on a computing device to perform actions. In an example these actions can include detecting a selection of the file stored in a file system. In an example, the system can also modify the file to indicate the number of ASFR associated with the file. The system can also send the modified file to a first user device.

21 Claims, 8 Drawing Sheets

(51) Int. Cl.
*G06F 16/11* (2019.01)
*G06F 21/12* (2013.01)
*G06F 21/62* (2013.01)
*H04L 29/08* (2006.01)

(52) U.S. Cl.
CPC ............ *G06F 21/629* (2013.01); *H04L 67/06* (2013.01); *G06F 2221/0768* (2013.01)

(56) References Cited

U.S. PATENT DOCUMENTS

| | | | |
|---|---|---|---|
| 2007/0043667 A1 | 2/2007 | Qawami et al. | |
| 2010/0293622 A1* | 11/2010 | Nikitin | G06F 21/10 726/31 |
| 2011/0167499 A1* | 7/2011 | Strom | G06F 21/121 726/27 |

OTHER PUBLICATIONS

"First Office Action and Search Report Issued in Chinese Patent Application No. 201680061171.2", dated Nov. 27, 2020, 11 Pages.

* cited by examiner

MANAGING APPLICATION SPECIFIC FEATURE RIGHTS

CROSS-REFERENCE TO RELATED APPLICATIONS

This application is a continuation of U.S. patent application Ser. No. 14/887,016, filed Oct. 19, 2015, and entitled "MANAGING APPLICATION SPECIFIC FEATURE RIGHTS", the application of which is incorporated herein in its entirety by reference.

BACKGROUND

The software industry is transitioning from a model of selling simple perpetual licenses to application software, to a new "freemium" model where users can utilize an amount of functionality of an application free of charge, but users may be required to pay for premium features, functionality or unrestricted use. Accordingly, different versions of applications can provide different features or editing functionality and tools to that application depending on paid versus unpaid versions of the application. The features available can also work on a tiered system where a certain payment enables only certain features, but not all features.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a system for modifying application specific feature rights, including a processor and a file system storage to store a file, wherein the file system includes a number of application specific feature rights (ASFR) corresponding to the file. The system can also include a number of ASFR that designate a client type that can trigger activation of features indicated by the ASFR. The system can include a processor and a computer-readable memory storage device storing executable instructions to be executed by the processor to cause a modifying service implemented on a computing device to perform actions. The system can also detect a selection of the file stored in a file system. In an example, the system can also modify the file to indicate the number of ASFR associated with the file. The system can also send the modified file to a first user device.

An embodiment provides a method for modifying ASFR. The method can include detecting a selection of a file stored in a file system, the file system including a number of ASFR corresponding to the file. The method can include modifying the file with the processor to indicate the number of the ASFR associated with the file. The method can also include sending the modified file to a first user device.

An embodiment provides a system for modifying application specific feature rights including a processor to identify an application on the user device to execute a file received from a file system. The example system can be executed by the processor to cause a modifying service implemented on a computing device to identify an application on the user device to execute a file received from a file system. In an example the instructions are also to interpret the file received, the file including content and ASFR, the ASFR to designate a feature of an application to be presented in the application. In an example the instructions are also to enable the feature of the application to be executed on the file in response to the feature being identified in the ASFR.

BRIEF DESCRIPTION OF THE DRAWINGS

The following detailed description may be better understood by referencing the accompanying drawings, which contain specific examples of numerous features of the disclosed subject matter.

DETAILED DESCRIPTION

As the retail space for software transitions from a traditional boxed-software model to a "freemium" or subscription model, file manipulation or feature rights can vary between software versions. Newer subscription models of software deployment provide entry level users with a free version of software that has few or limited features, where a user can pay for options that enable more advanced features. However, management of this model can be a challenge in collaborative work environments, where users may wish to collaborate on the same work product but different users can use varying versions of an application to access a file—some users having premium features, other users having limited features. To enable a more flexible subscription model, the present disclosure is generally directed to file-based and file-system location based techniques for managing the feature rights or features. In some embodiments, feature rights associated with users, applications, and other software products can be based on the file being edited or even the storage or logical location of a specific file to be edited. Each file or file location can be associated with different application specific permissions to enable different advanced features or additional features of various applications. Additional features can include full versions of an application that offers complete offering of features available in an application. In an example, the types of features enabled can vary from file to file rather than being tied to a specific version of software bought or installed.

A system implementing the techniques of this disclosure can, for example, be utilized to designate a number of files, or a storage location for files, which when opened with their respective application, unlocks the additional or premium capabilities of that application. Similarly, a system implementing the techniques of this disclosure can also limit or reduce the functionality of the application when opened on the same application.

A variety of methods can be employed to decide which files unlock additional functionality of software. For example, when application specific feature rights are granted to a file, the file can also include, in some examples, the ability to grant a number of other files access to software features with the same permissions as the originally file. In this way, premium, or increased capability features can be associated with a number of files (e.g., a group of files associated with a project) rather than one file. In another example, files with application specific feature rights (ASFR) can be associated or can associate certain features to a specific user or users. In another example, the ASFR can be stored or associated in a file system, and more specifically, the rights and features enabled by ASFR can be applied to files within the associated location.

In addition, the disclosed technology can enable file-based features for extensions for third-party add-ons to software. For example, developers of an add-on application for software, where the add-on can be embedded into a specific document or the software itself, can choose to restrict the feature rights granted or enabled by their add-on. This restriction could follow the file-based feature rights model; could limit the free use of the third-party add-on to a limited number of documents per user; or could enable these add-on feature rights for unrestricted use based on the specific document, document location, or user identification showing the user using the application.

Figure 1:
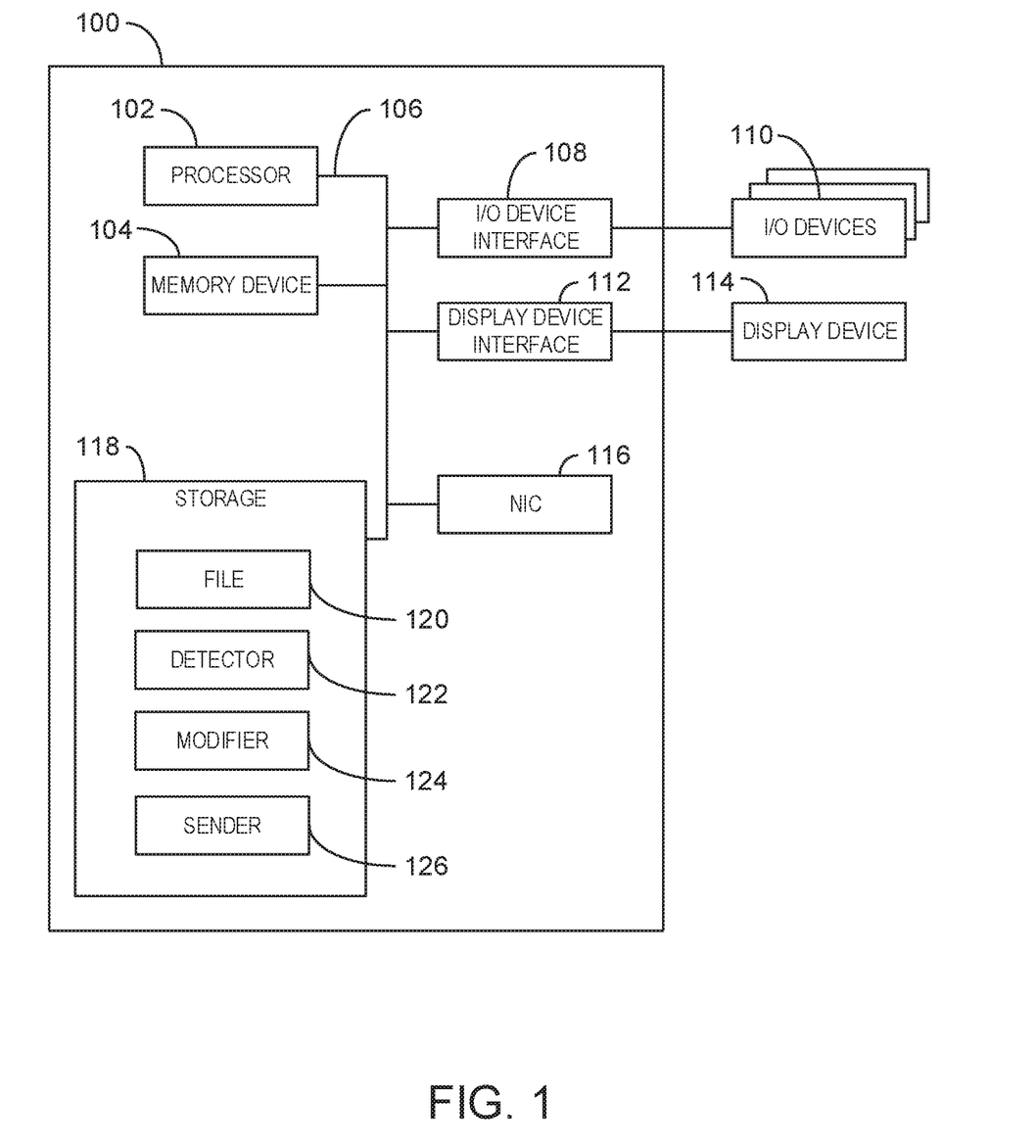
FIG. 1 is a block diagram of an example of a computing system to modify application specific feature rights (ASFR)

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

The term "logic" encompasses any functionality for performing a task. For instance, each operation illustrated in the flowcharts corresponds to logic for performing that operation. An operation can be performed using software, hardware, firmware, physical electronic circuits, and the like, or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media does not include all implementations of computer-readable media generally, such as signals per se. Therefore, in contrast, computer-readable media generally (i.e., not computer-readable storage media) may additionally include communication media such as transmission media for wireless signals and the like.

FIG. 1 is a block diagram of an example of a computing system to modify application specific feature rights (ASFR). The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to modify application specific feature rights.

The processor 102 may be connected through a system bus 106 (e.g., PCI, ISA, PCI-Express, NuBus, etc.) to an input/output (I/O) device interface 108 adapted to connect the computing system 100 to one or more I/O devices 110. The I/O devices 110 may include, for example, a keyboard, a gesture recognition input device, a voice recognition device, and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display device interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. A network interface card (NIC) 116 may also be adapted to connect the computing system 100 through the system bus 106 to a network (not depicted).

The storage 118 can include a hard drive, an optical drive, a USB flash drive, an array of drives, or any combinations thereof. The storage 118 may include a file 120, a detector 122, and a sender 126. In some embodiments, the file 120 can include application specific feature rights (ASFR) to designate to the computer 100 or an application running on the computer 100, which feature rights can be used on that file, for a particular duration, or at a particular file location. For example, the file 120 can include ASFR that indicate to an application running on the computer 100 that additional features of the application can be used on the file 120. In another example, the ASFR are not located on the file, but can instead be corresponded to or associated with the file and located elsewhere in a file system existing on the storage 118, the memory device 104, or any other suitable means for tracking ASFR and the files they affect.

The detector 122 can detect the selection of the file 120 stored in a file system such as the storage 118. This detected file selection can be the result of user input, automatic selection based on the file meeting a selection criteria, or any other suitable selection reason. The detector 122 can further identify a number of ASFR in a file system that can exist on the storage 118 or memory device 104. When a detector detects the selection of file 120, the detector can also detect a number of ASFR corresponding to the file 120.

The modifier 124 can modify the file to indicate the number of ASFR associated with the file. In an example, the modification can include inserting the information from the ASFR to the metadata of the file. In this example, the metadata can include data stored within the file that generally shows information about the file, including file type, global permissions, time of creation, author, or other similar information. In an example the modifier 124 can modify the file to indicate the number of ASFR by altering existing permissions in the file to include application and feature specific permissions and then adjusting these permissions to match the ASFR information. In an example, the modifier 124 can modify the file by removing portions of the data that are functional components for features of an application such as indexes of files, benchmarking information in video files, save data, undo data, file history or other similar data portions. In this example, the modifier can remove the portions of data that are functional components for features of an application in order to limit or enable those features from being usable on an application.

The sender 126, can send the file 120 and an indication of the corresponding number of ASFR to a first user device. The indication sent by the sender 126 could alert any suitable device, application, machine, or add-on software of the ASFR corresponding to the file 120 sent by the sender 126. The indication sent by the sender 126 can also follow the file 120 it corresponds with if the file 120 is sent to another device, machine, application, or add-on.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.).

Figure 2:
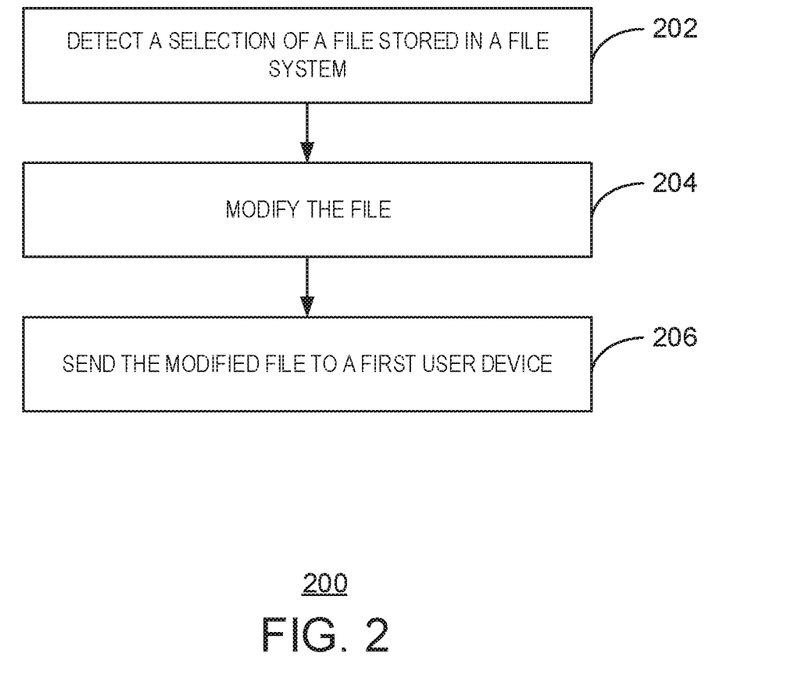
FIG. 2 is a process flow diagram of an example process to modify ASFR.

FIG. 2 is a process flow diagram of an example method 200 to modify ASFR. The method 200 can be implemented with any suitable computing device, such as the computing system 100 of FIG. 1. Like numbered items are as described in FIG. 1.

At block 202, the selection of the file 120 stored in a file system is detected by a detector 122. For example, a corresponding ASFR stored in the file system can also be detected, where the ASFR corresponds to the file 120 detected by the detector 122. In an example, the ASFR is based and stored within the file itself, while in another example, the ASFR is stored within the file system in a cloud storage format, or within a shared network. In examples, ASFR can include a number of permissions, rights, keys, function enabling code, or certificates that outline what feature rights and abilities are enabled, allowed, or granted to an application that can open and edit the file 120. In an example, the ASFR corresponding to the file 120 can be managed or changed while the file 120 is open or otherwise in use. In another example, the ASFR can correspond to a location in a file system, where the file system can include the file 120, and where the ASFR can be detected as corresponding to each file located within the ASFR corresponded location of the file system. In an example, the ASFR detected can also include an association to a user identification value or values. In this example, the association of ASFR to a user identification value, while also corresponding to the file 120, can further allow an identified user full functionality based by the ASFR while limiting the functionality for files by users without ASFR identification. In an example, the detection of ASFR that corresponds to the file 120 can enable a user with an associated user identification value to add other user identification values to the ASFR to be stored in either the file, or associated with the file in the file system storage, a cloud structure within the file system storage, or any other suitable value storage system.

At block 204, a modifier can modify the file to indicate the number of ASFR associated with the file. In an example, this can include modifying any data of the file or associated with the file including content data, metadata, or data not located within the file wrapper, but directly referenced or linked to the file including information stored on a server referencing the file. As discussed above, the modifier can modify the file in a number of ways so that the modifications are coupled to the file during subsequent file transfers. By modifying the file directly, the rights and features granted for a file can be transmitted with a file to enable additional devices and users to access the file. In an example, a user can request a service to associate additional feature rights to a file or a number of files (e.g., by payment to a third-party service). These modified files can then continue to enable the additionally added features when the file is accessed on additional devices or by additional users. In an example, a file can have ASFR that indicate additional features for multiple applications that can access the file. In some examples, the ASFT indicating the additional features, which multiple applications can use to edit a file, can be included in the file or in data associated with the file.

At block 206, sender 126 can send the modified file to a first user device. In an example, the modified file carries an indication that it is modified, and that it can access additional application features based on the altered data in the file. In an example, the modified file can also be sent with an indication of the modification that is not included in the file, but is still associated with the file. In an example, this indication can be separate data sent to a file-server that can confirm a status of a file and what application feature rights a file can have if an application requested this confirmation from the file-server. In some examples, an indication is not sent and instead ASFR rights are stored separately for later reference. In an example, the file and indication can both be sent to a first user device, where the first user device can run an application to read or execute the file 120 based also on the ASFR communicated in the indication. The modified file or the indication can represent the ASFR to a receiving device or machine. The modified file or the indication can include the functions enabled by the ASFR for the file 120 detected by the detector 122. In an example, the modified file and indication can be associated such that if the first device sends the file to a second user device, and the indication can travel with or at least be accessible by the second user device. In an example, the association of an ASFR indication with a file can enhance the file as the rights and functionality enabled by the ASFR can be transmitted with the file rather than be exclusively associated with a particular program or machine.

Figure 3:
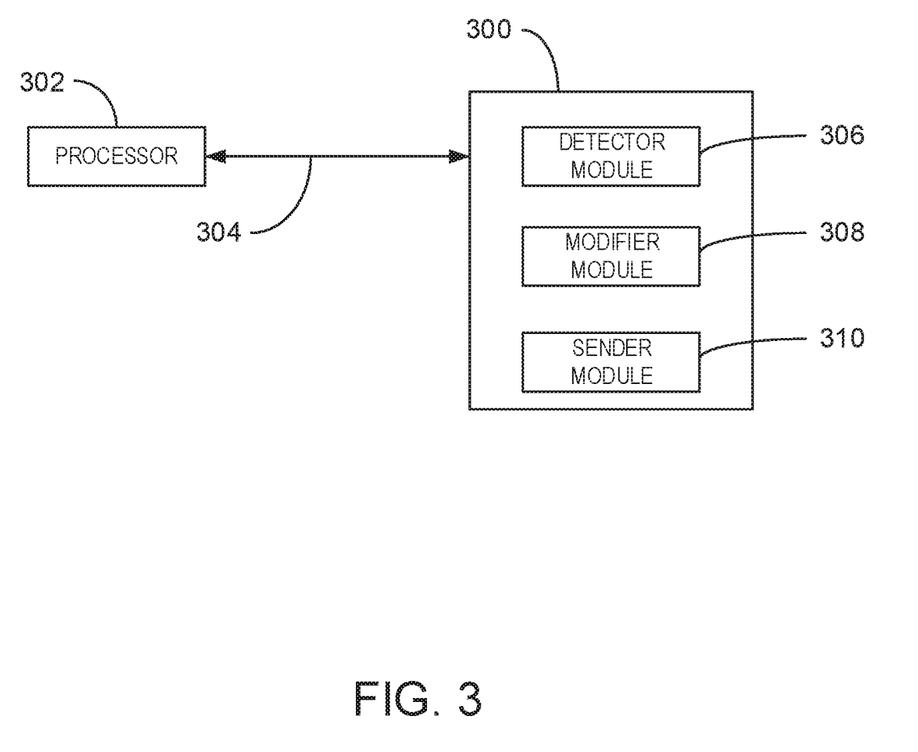
FIG. 3 is block diagram of an example computer-readable storage media to modify ASFR.

FIG. 3 is block diagram of an example computer-readable storage media 300 to modify ASFR. Like numbered items are as described in FIG. 1. The tangible, computer-readable storage media 300 may be accessed by a processor 302 over a computer bus 304. Furthermore, the tangible, computer-readable storage media 300 may include code to direct the processor 302 to perform the steps of the current method.

The various software components discussed herein may be stored on the tangible, computer-readable storage media 300, as indicated in FIG. 3. For example, the tangible computer-readable storage media 300 can include a detector module 306 for detecting a file 120 stored in a file system, the file system including a number of ASFR corresponding to the file 120. For example, the detector module 306 can detect, either locally within the computer-readable storage media 300 or in another device, machine, cloud storage, or device, a file stored within a file system. In an example, the detector module 306 detects the number of ASFR of the file 120 based on the location of the file 120 in the file system. In an example, location based detection of a file and the corresponding number of ASFR can allow the computer-readable storage media 300 to associate an ASFR with any file within a location in a file system.

In an example, the tangible computer-readable storage media 300 can include a modifier module 308 for modifying a file 120 to indicate the number of ASFR associated with the file. In an example, the modifier module can modify the file 120 by altering the files content or metadata, or modify the file in other ways to indicate the features and rights corresponding to the file 120.

In an example, the tangible computer-readable storage media 300 can include a sender module 310 for sending a file 120 and an indication from the computer-readable storage media. For example, the sender module 306 can send both the file and the indication to a first user device. In an example the indication identifies ASFR that corresponds to the file 120 being sent. In an example, the sender module 306 sends the file 120 and the indication to a first user device, where the indication is sent with the file 120 if the file 120 is sent to a second user device. This can allow the ASFR to be subsequently transmitted with a file rather than a user, device, or specific program; however each of these data or classification fields (e.g. user, device, and program) can be included in an indication to be sent by the sender module 310 as well. In an example, the indication includes a user identification value to be sent by the sender module 310 with the file 120 whether the file is sent to a first user device, or later sent a second time to a second user device. This second sending can be done by the sender module 310 or by the first user device that has received the file 120. In an example, the sender module can also send notification data to be displayed wherever the file 120 is sent, including to a first user device, a second user device, or by use locally by the computer-readable storage media. In an example, this displayable data can be sent prior to a dissociation event to warn of a dissociation of the ASFR from the file 120. A dissociation event can be the transmission of data or notification to a client or receiver indicating a dissociation of the ASFR from the file 120. Upon receipt or detection of a dissociation event, a client or receiver can take action based upon particular dissociation indicated by the dissociation event. In an example, the displayable data to be sent by the sender module 310 can be prior to a dissociation event including a dissociation of a user identification value from a file or from an ASFR. The management of association and dissociation of identification values like a user identification value can allow for greater security of a system implementing ASFR corresponding to files. In an example, the notification sent by the sender module 310 can also include displayable techniques to follow and act on to avoid a dissociation event. In an example, the techniques to avoid a dissociation event can include renewing a subscription to a particular set of features enabled by ASFR for a particular file or location of files (e.g., through payment). In an example, other methods of delaying an ASFR dissociation include watching an advertisement, performing an action such as a purchasing action, or through a detection that there has been active or recent use of the application's abilities enabled by the corresponding ASFR. In another example, a notification can be sent regardless of whether an ASFR is expired or not, wherein the notification can display potential features that could be enabled by ASFR if a user or device received access to additional application functionality. In another example, if one user device has a particular ASFR for a file and shares the file and indication of ASFR with a second user device, a subsequent revoking of ASFR from the first user device could also remove the ASFR from second user device. In this example, the second user device may receive a notification of the termination of certain application features and that one underlying reason is the lack of ASFR being provided to file by the first user device.

It is to be understood that any number of additional software components not shown in FIG. 3 may be included within the tangible, computer-readable storage media 300, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Figure 4:
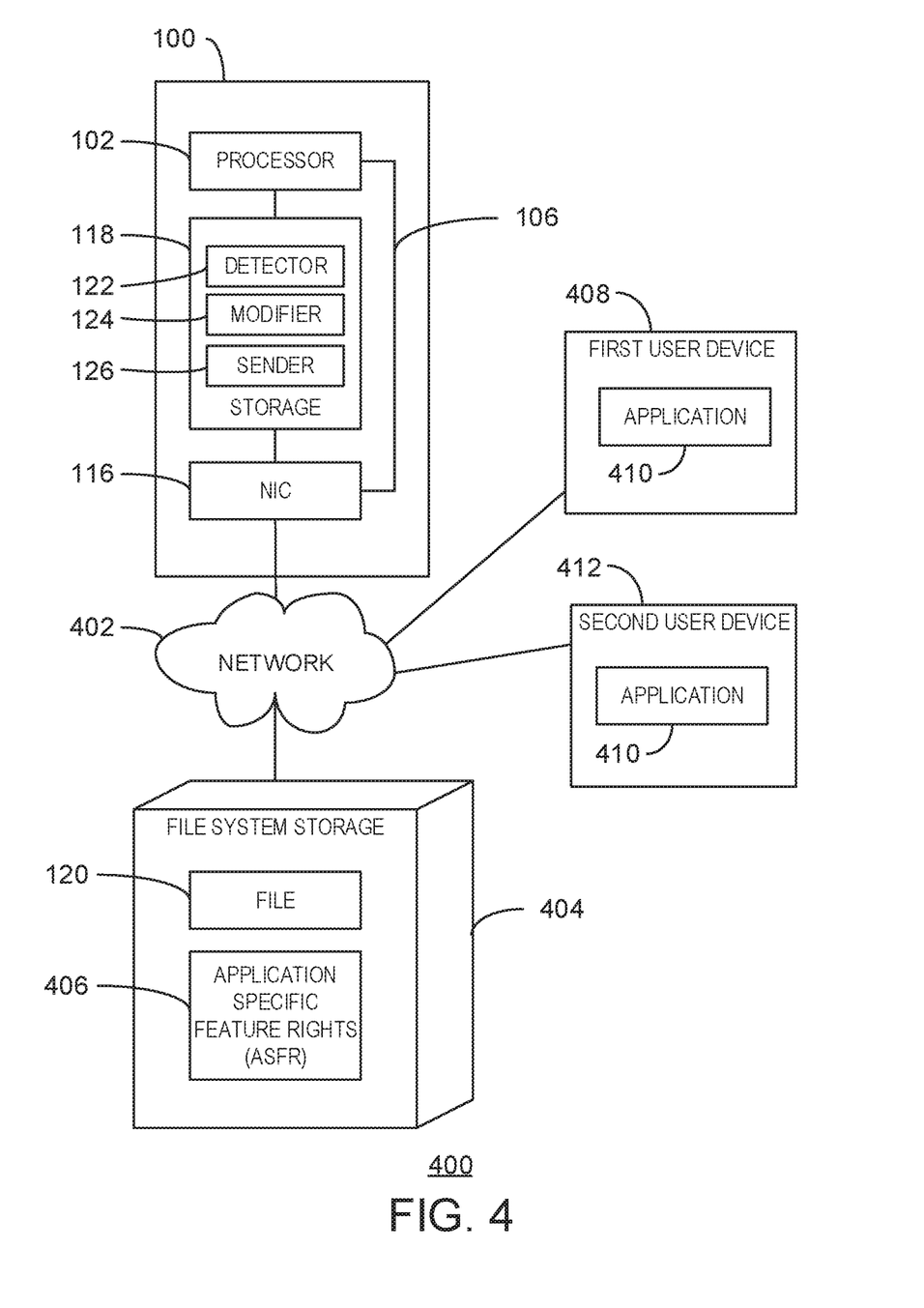
FIG. 4 is a block diagram illustrating an example networked system for modifying ASFR with a file system and user devices.

FIG. 4 is a block diagram illustrating an example networked system 400 for modifying ASFR with a file system and user devices. Like numbered items are as described in FIG. 1.

The networked system 400 can include a computer system 100 connected to a network 402 through its network interface card (NIC) 116. The network can also connect to a file system storage 404. The file system storage 404 can be separate from the computer system 100 and connected by the network 402. In some examples, the file system storage 404 is stored within the computer system 100, or it can also be a part of the storage of the computer system 100, or distributed in a cloud storage system.

In an example, the file 120 can be stored in the file system storage 404 of the networked system 400. In an example, the file system storage 404 can also include application specific feature rights (ASFR) 406. The ASFR can be stored in the file 120, as a separate certificate in data form, or any other suitable means for storing information about the application feature rights associated with a certain file or location. The file system storage 404 can be a single physical storage device, and can also be a cloud storage solution. In an example, the ASFR 406 correspond to the file 120 stored in the file system storage 404. In an example, the ASFR 406 is stored as part of the file 120, or as data in the network 402, or in a file system storage 404 that is stored in a cloud of computer systems.

As discussed above, the detector 122 can detect a file in the file storage system 404, where the file system storage 404 includes ASFR 406. The detection of the file 120 in the file system storage 404 with the ASFR 406 corresponding to the file 120 can occur over the network 402. As discussed above, the sender 126 can direct the sending of the file 120 and an indication of the ASFR to a first user device 408 over the network 402. The sending of the file 120 and indication of ASFR 406 can provide an application 410 on the first user device 408 the ability to use additional application 410 functions, based on the ASFR 406 identified by the indication. For example, if the file 120 were sent to the first user device 408 without an indication of the corresponding ASFR 406, then the application may not have the feature rights identified by the ASFR 406 for the file 120. In an example, the application 410 can be a third-party add-on to a larger application. The add-on version of the application 410 managed by ASFR 406 associated with the files, can enable the management of features for add-ons a file-by-file basis. For example, a third-party provider may choose to allow their add-ons or templates for a specific application 410 to be accessed on a per-file basis. In some examples, the allowance can enable full-featured access to the application 410 without restriction to a user device for a number of files that use the add-on. In some embodiments, access to application features associated with subsequent files 120 can either be limited by more restrictive ASFR 406 or can trigger a notification to prompt a user to perform an action to re-enable the rights to grant the user access to the additional features of the add-on of the application 406.

In an example, the file 120 can be sent a second time from the first user device 408 to the second user device 412. The sending of the file can be done by the sender 126 or can be initiated from the first user device 408. In an example, the ASFR 406 can be sent with the file 120 to the second user device 412. The sending of the file 120 and indication of ASFR 406 can provide an application 410 on the second user device 412 the ability to use additional application 410 functions, based on the ASFR 406 identified by the indication. For example, if the file 120 were sent to the second user device 412 without an indication of the corresponding ASFR 406, then the application 410 may not have the feature rights or functions identified by the ASFR 406 for the file 120.

In an example, a service provider may provide an application for use by computer systems 100 for storing and accessing files in a service provider's storage system 404. A computer system 100, first user device 408, or second user device 412 can, in an example, access applications and files stored in the file system storage of the service provider, based on the ASFR associated with each file being access or location of the file. In an example, the ASFR associated with each file, for specific user devices can be based on a subscription paid to gain access to certain features of the application hosted or provided by the service provider.

In an example, a service provider can provide a location for storage of files in the file system storage 404, where the files stored in this designated location have ASFR 406 associated with them to enable additional features or a heightened functionality for applications running these files. In this example, a user device opening or editing a file 120 can check with the service provider to determine that a certain location on the file system storage 404 is associated with particular ASFR.

In an example, a first user device 408 and a second user device 412 may receive a file 120 that does not contain ASFR 406. In this example, the first user device 408 and the second user device 412 can check the file system storage 404 to confirm whether or not ASFR 408 exist that correspond to a particular file 120. In this example, the file system storage 404 can act as a service to keep track of the feature rights associated with each user device for files managed by the file system storage 404 as well as certain file locations.

In an example, the user devices can exert some control on which files in the file system storage 404 have additional or enhanced ASFR. Specifically, the first user device 408 can be given the authority by a service provider's file system storage 404 to select certain or additional application features for particular files that can be enabled for applications used to run and edit the file 120. In an example, the ability of a user device to have the additional application features it has selected only lasts as long as the file system storage 404 grants the user device the authority to make those types of designations.

In an example where the user device attempts to edit a file 120 locally, rather than on the file system storage 404, the user device can download the designated file for local editing based on the ASFR 406. In an example, the ASFR 406 can be communicated to the user device by the placement of a certificate indicating the rights conveyed by ASFR 406 inside the file. In an example, the file 120 can be cryptographically signed by a service provider so that when the application 410 opens the file, the application can verify the signature belongs to the service provider, and that the signature matches the file. In an example, this verification can prevent tampering by users who may seek to add flags to arbitrary files without going through a service provider. If the file 404 passes a signature check, a user device with the file 120 can edit the file 120 with additional application functionality. In an example, if the file does not pass a signature check, a user device may be limited to reduced application functionality when accessing the file.

In an example, a network connection to a service provider can verify proper certification such that a user device can re-certify and re-sign the file 120. If a file's feature rights, as stored in the ASFR portion of a file attaches to a subscription term of a service, a certificate inside the file or ASFR can store the subscription's expiration date and also a unique identifier for the subscription.

In an example, when the file 120 is saved in the file system storage 404, an expiration date can of ASFR 406 can be updated if a specified subscription has been renewed. In examples where a current date is after the specified expiration date of ASFR 406 for a file, an application 410 opening the file 120 can sync with the service provider operating in a file system storage 404 to determine if a subscription for a file's ASFR 406 has been renewed. If not, the file 120 may not be usable with additional application functionality.

In an example, the user implementing ASFR 406 and the presently disclosed system, can be granted their ASFR 406 with the ability to designate and save data to a privileged location such as a file system storage 404. In this example, and based on the ASFR 406 the user is licensed to use or has purchased, the user can designate a second user who can also access the file 120 saved in this privileged location. A second user who is provided ASFR 406, a file location, or access to this unlocked file, can receive as many or fewer rights that were are managed by the original user.

In an example, ASFR 406 can be managed or conferred automatically based on their storage in a particular location, such as a designated file storage system 404. The file storage system 404 can also determine which ASFR 406 to provide for a file, user, or device based on a user, device, or network that put the file in the file storage system 404. For example, if the file storage system 404 is owned by a single user who has acquired a certain set of ASFR 406, any files stored in the file storage system 404 may not reference the location of their storage, but instead a user identification number for the user who operates, owns, manages, or otherwise is assigned or associated with a file storage system 404.

The application feature rights granted may depend on the device used, even for the same file in the same location. So for example, a tablet/mobile device could have fewer rights than a desktop PC.

Some rights may be granted to files that are on a public share system where the files can be viewed without restriction. In other words, a user may have access to additional application features but not privacy or the right to move a file.

Figure 5:
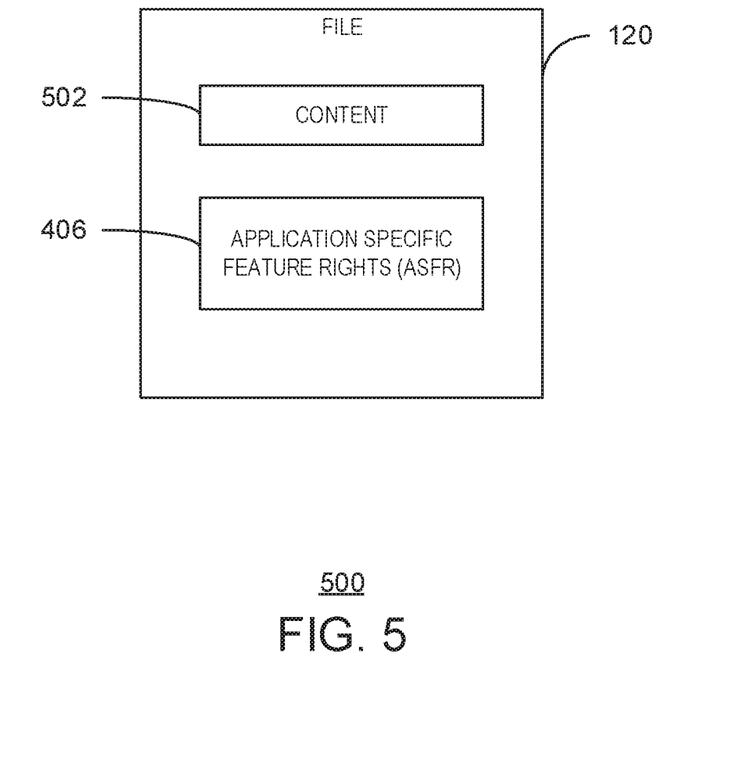
FIG. 5 is a block diagram of an example file with ASFR.

FIG. 5 is a block diagram 500 of an example file with ASFR. Like numbered items are as described in FIG. 4.

The file 120 can be a collection of data sent, received, and stored by a computer system 100. The file 120 can be stored in a single physical place or in several physical places, but is logically regarded as a single collection of information. The file can include content 502 that can include text data, video data, still image data, sound information, or any other suitable collection of information that a computer system 100 can process. In some examples, the file 120 can include metadata which while not always a part of the content 502 of the file, can include information about the file 120 itself, such as the type of file, the size of the file, the origin of the file, the authorship, and many other similar points of information about the file 120. In an example, a flag for a file 120 designation of ASFR can be stored with the file 120. When a file 120 is designated, a 'flag' can be added to the file's metadata that marks it as being eligible for full or increased functionality depending on the ASFR associated with the file. In an example, the file and its metadata can be stored in cloud storage, and the user device may not be able to freely manipulate the flag locally to grant itself the ability to edit the file.

In an example, if a user device requests access to a file along with additional feature capabilities for a specific program for the specific file, the application can check with the file system storage or cloud storage servers to determine whether the file has the proper ASFR. This check can be done over a secure connection to verify that the communication is with the genuine server, and is not being tampered with. In an example, if the server indicates that the file is designated with proper ASFR, the user device may have access to edit the file with additional functionality of an application; if not, the user device may only be given access to a limited or reduced functionality on the application with this particular file.

In an example, the application feature rights could dissociated if a file exceeds a file parameter, where the parameter can be the size of the file, age of the file, time spent editing the file overall or by user, number of editing sessions made, how often certain application features have been used within a single file, and other similar parameters. In an example of this, the content 502 can be limited, or have limited application feature rights in particular sections of a specific file 120. Having appropriate size limits by limiting an amount of content 502 on a file 120, or dissociating application feature rights in certain sections or larger than certain sizes can reduce opportunity for abuse of a file-based system for additional application feature rights. For example, rather than obtaining the ability to certain application feature rights for ten separate files, the content from those ten files could be manually added by a user intent on avoiding payment, to a single file with ASFR 406 enabling additional application feature rights. In this example, a limit on the size of the content 502 in a file 120 could remove the worst abuse of this issue. As mentioned above, many different user-influenced parameters of the file can be used to trigger various limitations on the application functionality. For example, if the file included text content, the content 502 could be limited to 50 pages of content 502 to have the application features enabled by the ASFR 406. In an example, the ability to limit application functionality based on a file parameter and the use of ASFR can also involve Information Rights Management (IRM) techniques and similar digital rights management (DRM) features. In an example, the inclusion of these features could be used to restrict what parts of a file can be edited, or restrict what the ASFR-licensed user can do with a file. In an example, a user can create a document containing a form which, using IRM, allows designated fields to be edited. In this example, and due to the pairing of IRM with ASFR, another user who receives the document can be sufficiently licensed to edit the document, while being restricted in what parts of it the user can edit.

The file 120 here includes application specific feature rights (ASFR) 406 within the file, although other files may not include ASFR 406. Containing the ASFR within the file allows ease of transport of both the file and the ASFR 406 from one machine to the next. As discussed above, the particular ASFR 406 associated with each file allows the application feature rights to vary from one file to the next. In other examples, the file 120 does not include the ASFR 406, but instead the ASFR 406 can be located in a separate storage and simply associated with the file 120 in order to provide information as to the application feature rights of that particular file. In an example, the file 120 can be access and edited in locations designated by a service provider, or in a cloud storage system operated by a service provider.

Figure 6A:
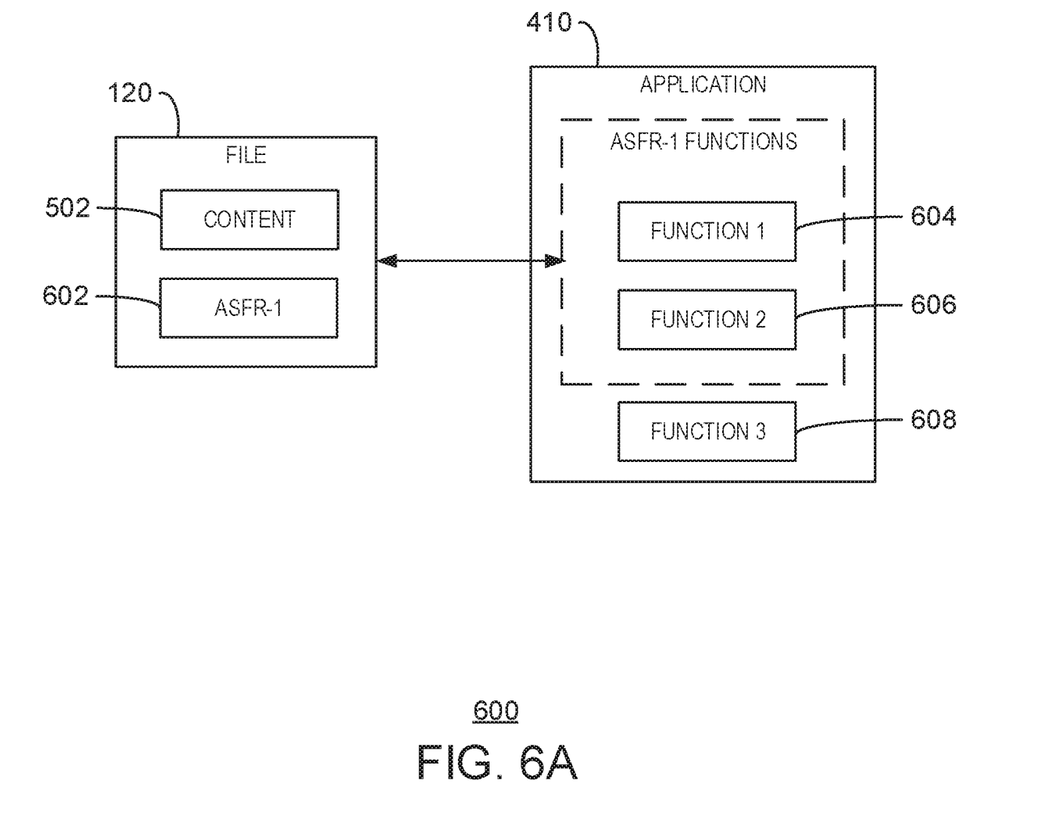
FIGS. 6A and 6B show block diagrams of an example file and application system to implement ASFR and modifications to ASFR.
Figure 6B:
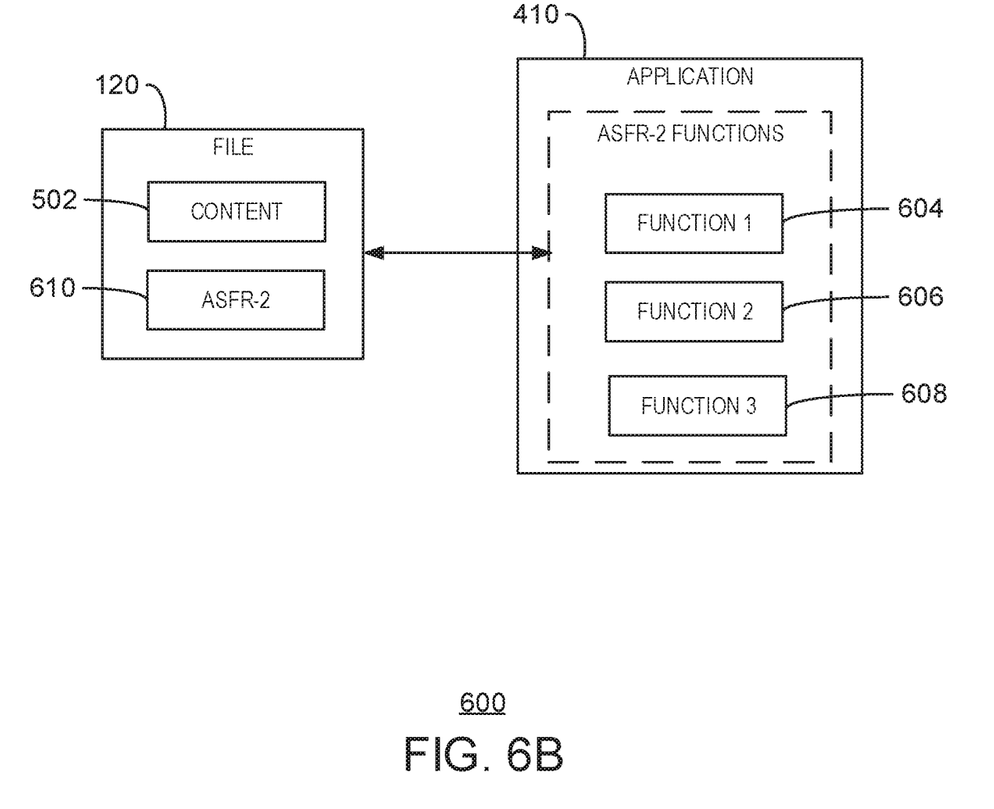

FIGS. 6A and 6B show block diagrams of an example file and application system 600 to implement ASFR and modifications to ASFR. Like numbered items are as described in FIGS. 4 and 5.

In FIG. 6A, a file 120 includes content 502 and ASFR-1 602. The file 120 can be run, executed, viewed, edited, or similar functions on the application 410. The ASFR-1 indicates which, if any, feature rights, or additional feature rights, the application 410 can have when handling the file 120 and file content 502. In an example, the application 410 includes several functions that can be applied or undertaken with the file 120. A function 1 604, a function 2 606, and a function 3 608 can be possible for the application 410 when working with the file 120. In an example, the feature rights enabled by a file with an associated ASFR-1 only allows the application 410 to use function 1 604 and function 2 606. In an example, perhaps a user using the file 120 has only downloaded and is using a "free version" of the application 410 which allows access to the more basic function 1 604 and function 2 606. In an example, as the ASFR-1 602 is associated with the file 120, the application 410 can vary the functions it can use depending, in part, on the file the application 410 works with.

In FIG. 6B, the file 120 includes content 502 and ASFR-2 610. The ASFR-2 610 feature rights can be read by the application 410 and allow access of the file 120 to function 1 604, function 2 606, and function 3 608. In an example, the ASFR-2 610 can be contained within the logical boundary of the file 120 but can also simply be associated with the file 120 and stored in a separate physical or logical space. While in the example shown in FIG. 6B shows the enabling of ASFR-2 Functions, ASFR may not always increase the number of functions, but instead may designate which functions an application can use when working with a particular file. In an example, if a file has no corresponding ASFR, then the application 410 can revert to a state where functions may not be active or very few functions may be used with the file 120. When an application 410 is reduced in its functionality, the functionality may simply not be present for a specific file, user, or file location, while still being made available to other files with the appropriate feature rights for that specific application. Similarly, in an example, an application 410 with limited functionality may allow a user device or a computer system 100 to only read a file without editing the file.

Further, while the term function is used for function 1 604, function 2 606, and function 3 608, the term function can also include any type of action or interaction that an application has with a file with a particular ASFR.

In an example, the application 410 can gain or lose functions for either ASFR-1 602 or ASFR-2 610 based on an update to the application's functionality itself. In this example, a new version may be provided to users of a service where functionality of the application upgrades, is reconfigured, or is otherwise changed. In this example, a vendor of the application can push these updates in an application 410 and the ASFR 406 of each file 120 to users of the application 410. In an example, users who store, access, or receive the file 120 can be notified of the change in features available for a particular application 410. In an example, if rather than the vendor of an application, instead a user alters their own ASFR 406, by upgrading or downgrading a service at a user device or storage location, then ASFR 406 can also change without actions taken by a user, user device, or vendor on files that have been previously shared.

Figure 7:
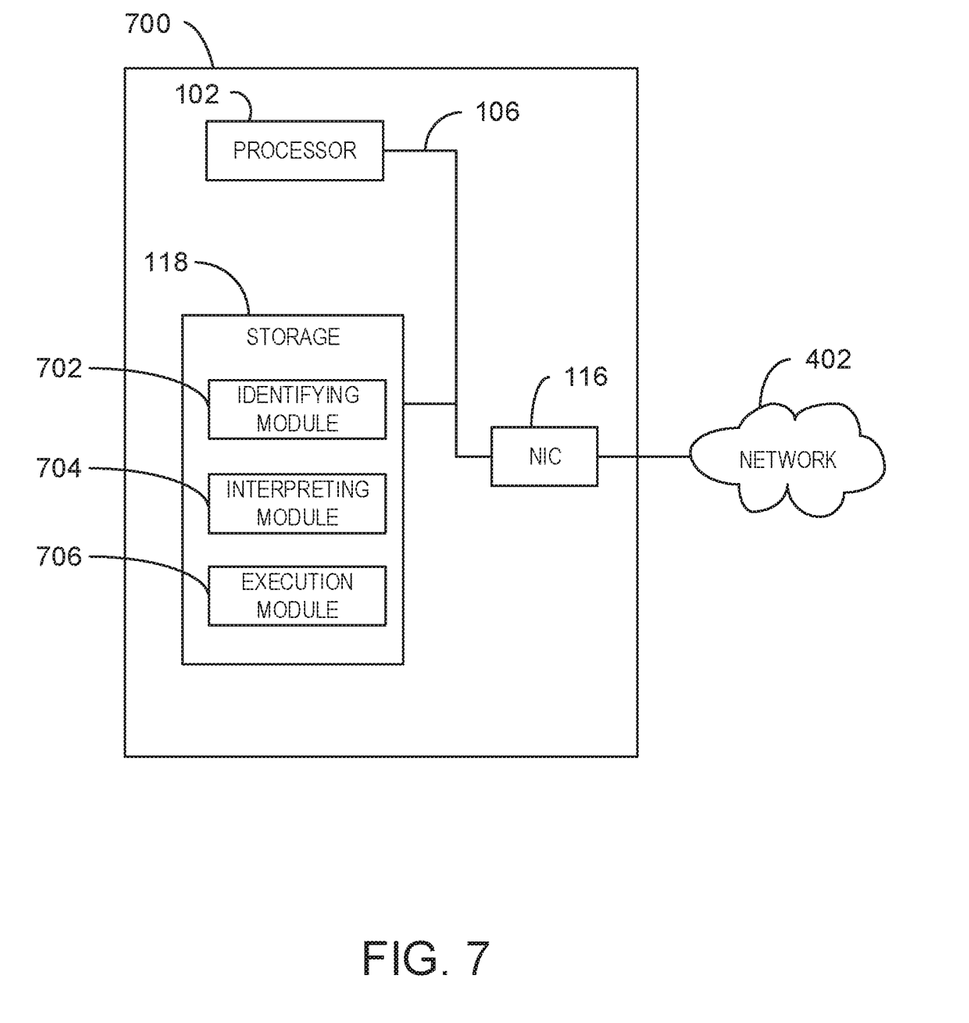
FIG. 7 is a block diagram of an example of a system to interpret and execute application specific feature rights (ASFR) on a file.

FIG. 7 is a block diagram of an example of a system 700 to interpret and execute application specific feature rights (ASFR) on a file. Like numbered items are as described in FIG. 1 and FIG. 4.

The system 700 can be a computing system used by a user to access and manipulate files stored on a storage 118. The file can be received from a file system by the system and identified, interpreted, and executed according to its contents and the rights it includes.

The system 700 can include a storage 118 with an identifying module 702. The identifying module 702 can identify an application that can operate on the system. In an example, the identifying module 702 can identify an application able to execute, read, write to, or otherwise modify a file received from a file system.

The system 700 can include an interpreting module 704 to interpret the file received. In an example, the interpreting module 704 can interpret the contents and ASFR included in the file. In an example, the interpreting module 704 can identify not only the ASFR, but also identify specific features of an application the ASFR allows an application to run.

The system 700 can include an executing module 706 to enable the feature of the application to be executed on the file in response to the feature being designated by the interpreting module 704. In an example, if the system 700 receives a file (e.g., a video file) that is to be opened by an application identified as corresponding to the file type by the identifying module 702 (e.g., a video editing program) the interpreting module 704 can interpret the file to identify which features of the video editing program can be made available by the execution module 706 that is running the video editing program. In this example, if the ASFR indicates rights for this file to use a particular feature in the application, the execution module 706 can enable this feature in the application. In this example, if a video file did not have ASFR for a feature of the video editing software (e.g. a tool to add lens flare effect) that feature would not be enabled for this particular file. However, in this example, if the system 700 received a second file with ASFR that indicated the lens flare tool feature should be enabled for the file, the execution module 706 can enable the feature of the application to be executed on the file.

In an example the interpreting module 704 detects the ASFR corresponding to the file and stored in a file system. In an example, the system 700 includes an association module to correspond the module to a user identification value, wherein the ASFR and the file can be modified to indicate a second user identification value to be associate with the ASFR. In an example, the system 700 includes a notification module to generate notification data to be displayed by the first user device prior to an ASFR dissociation event. This notification can be sent to a display device, or may be sent through a network to a user or other device that can view, read, or act on the notification. In an example, the notification can indicate steps to avoid the ASFR dissociation event.

Example 1

A system for modifying application specific feature rights (ASFR), including a file system to store a file, wherein the file system includes a number of ASFR corresponding to the file, where the number of ASFR designates a client type that is to trigger activation of features indicated by the number of ASFR. The system can include a processor and a computer-readable memory storage device storing executable instructions that can be executed by the processor to cause a modifying service implemented on a computing device to detect a selection of the file stored in a file system, modify the file to indicate the number of ASFR associated with the file, and send the modified file to a first user device.

Example 2

A system where the file system storage corresponds the number of the ASFR to the file based on a location of the file in the file system.

Example 3

A system where the number of ASFR, which correspond to the file, are associated to a user identification value, wherein the number of ASFR stores a designation by the first user device of a second user identification value to include in the ASFR

Example 4

A system where the processor is to dissociate the ASFR from the file when a subscription term ends, and where the subscription term is for an application that runs the file.

Example 5

A system where the number of ASFR includes a number of subsets of full functionality an application has for the file, and the number of ASFR corresponding to the file includes associating a different subset of ASFR to each of the first user device and the second user device.

Example 6

A system where the processor, executing instructions stored in the file system storage, is to send notification data to be displayed on the first user device prior to an ASFR dissociation event. In this system the notification data is to indicate steps to avoid the ASFR dissociation event and provide an interface to enact the steps to avoid the ASFR dissociation event.

Example 7

A system where the processor, implementing instructions stored in the file system storage, is to dissociate ASFR from the file if the file exceeds a file parameter.

Example 8

A method for modifying application specific feature rights (ASFR), including detecting, via a processor, a selection of a file stored in a file system, the file system including a number of ASFR corresponding to the file. In example 1, the method can include modifying, via the processor, the file to indicate the number of ASFR associated with the file. In example 1, the method can include sending, via the processor, the modified file to a first user device.

Example 9

A method including detecting the number of ASFR of the file based on a location of the file in the file system.

Example 10

A method including associating the number of ASFR to a user identification value, wherein the number of ASFR stores a second user identification value based on a designation received from a first user device.

Example 11

A method where the ASFR are indicated by ASFR data that can be stored in a cloud storage.

Example 12

A method where ASFR data can be stored in the file and wherein the association of the ASFR to the file is modified at the first user device to allow a second user device to access the file with the associated ASFR.

Example 13

A method including dissociating the ASFR from the file when a subscription term ends, wherein the subscription term is for an application that implements the file.

Example 14

A method where the number of ASFR including a number of subsets of full functionality an application has for the file and associating a different subset of ASFR to each of the first user device and a second user device.

Example 15

A method including sending notification data to be displayed on the first user device prior to an ASFR dissociation event, wherein the notification indicates how to avoid the ASFR dissociation event.

Example 16

A method including dissociating ASFR from the file if the file exceeds a file parameter.

Example 17

A system for modifying application specific feature rights (ASFR), including a processor and a computer-readable memory storage device storing executable instructions. In an example the instructions are to be executed by the processor to cause a modifying service implemented on a computing device to identify an application on the user device to execute a file received from a file system. In an example the instructions are also to interpret the file received, the file including content and ASFR, the ASFR to designate a feature of an application to be presented in the application. In an example the instructions are also to enable the feature of the application to be executed on the file in response to the feature being identified in the ASFR.

Example 18

A system where the processor is to detect the ASFR corresponding to the file and stored in a file system.

Example 19

A system where the processor is to associate the ASFR, which correspond to the file, to a user identification value, wherein the ASFR and the file is modified to indicate a second user identification value to be associated with the ASFR.

Example 20

A system where the processor is to generate notification data to be displayed by the first user device prior to an ASFR dissociation event, wherein the notification indicates steps to avoid the ASFR dissociation event.

What is claimed is:
1. An application system to implement application specific feature rights (ASFR), comprising:
   a processor; and a computer-readable memory storage device storing executable instructions that in response to execution by the processor cause the processor to:

execute a file comprising a content and an ASFR;

run an application comprising a plurality of functions that interact with the content of the file; and enable a subset of the plurality of functions in the application, the subset selected based on the ASFR of the file, wherein an expiration date in the ASFR of the file is updated in response to a renewed subscription, and updating the ASFR comprises modifying a number of ASFR associated with the file where the updated number of ASFR associated with the file is updated in content data, metadata, and data referencing the file from a server.

2. The application system of claim 1, wherein the application was downloaded to the computer-readable memory storage device and run on the computer-readable memory storage device without a detection of a financial transaction indicator related to the application.

3. The application system of claim 2, wherein the free version of the application comprises an initially enabled function not included in the subset of the plurality of functions.

4. The application system of claim 1, wherein the application modifies the enabled functions in response to detecting a second file comprising a second ASFR is handled by the application.

5. The application system of claim 1, wherein, the ASFR is disposed within a logical collection of data referred to as the file.

6. The application system of claim 1, wherein the ASFR is associated with the file but stored within a collection of data logically separate from the file.

7. The application system of claim 1, wherein the ASFR is associated with the file and stored in a separate physical region of memory in the computer-readable memory storage device.

8. The application system of claim 1, wherein the plurality of functions of the application are initially disabled and the plurality of functions are enabled in response to the processor detecting the plurality of functions in the ASFR of the file.

9. The application system of claim 1, wherein the subset of the plurality of functions in the application are disabled in response to the application addressing a second file without the ASFR.

10. The application system of claim 1, wherein the processor is to disable an editing function associated with the file in response to the ASFR of the file not including the editing function.

11. A method to implement application specific feature rights (ASFR) on an application, comprising:

executing a file comprising a content and an ASFR;

running an application comprising a plurality of functions that interact with the content of the file; and enabling a subset of the plurality of functions in the application, the subset selected based on the ASFR of the file, wherein an expiration date in the ASFR of the file is updated in response to a renewed subscription, and updating the ASFR comprises modifying a number of ASFR associated with the file where the updated number of ASFR associated with the file is updated in content data, metadata, and data referencing the file from a server.

12. The method of claim 11, wherein the application is downloaded to the computer-readable memory storage device and run on the computer-readable memory storage device without a detection of a financial transaction indicator related to the application.

13. The method of claim 12, wherein the free version of the application comprises an initially enabled function not included in the subset of the plurality of functions.

14. The method of claim 11, wherein the application modifies the enabled functions in response to detecting a second file comprising a second ASFR is handled by the application.

15. The method of claim 11, wherein the plurality of functions of the application are initially disabled and the plurality of functions are enabled in response to a processor detecting rights for the plurality of functions in the ASFR of the file.

16. The method of claim 11, wherein the subset of the plurality of functions in the application, are disabled in response to the application addressing a second file without the ASFR.

17. The method of claim 11, wherein a processor is to disable an editing function associated with the file in response to the ASFR of the file not including the editing function.

18. A computer readable storage media for storing executable instructions to be executed by a processor, the instructions in response to execution by the processor to:

execute a file comprising a content and an application specific feature right (ASFR);

run an application comprising a plurality of functions that interact with the content of the file; and enable a subset of the plurality of functions in the application, the subset selected based on the ASFR of the file, wherein an expiration date in the ASFR of the file is updated in response to a renewed subscription and updating the ASFR comprises modifying a number of ASFR associated with the file where the updated number of ASFR associated with the file is updated in content data, metadata, and data referencing the file from a server.

19. The computer readable storage media of claim 18, wherein the application was downloaded to the computer-readable memory storage device and run on the computer-readable memory storage device without a detection of a financial transaction indicator related to the application.

20. The computer readable storage media of claim 19, wherein the free version of the application comprises an initially enabled function not included in the subset of the plurality of functions.

21. The computer readable storage media of claim 19, wherein the updated data referencing the file from the server is not located in a file wrapper of the file.

* * * * *